United States Patent [19]

Melcher

[11] 3,924,991
[45] Dec. 9, 1975

[54] INJECTION MOLDING APPARATUS

[75] Inventor: Robert Albert Melcher, Gerlingen, Germany

[73] Assignee: Schloemann-Siemag Aktiengesellschaft, Düsseldorf, Germany

[22] Filed: Apr. 22, 1974

[21] Appl. No.: 462,976

[30] Foreign Application Priority Data
June 7, 1973 Germany............................ 2329097

[52] U.S. Cl. ................ 425/190; 425/185; 425/183; 425/246; 425/247
[51] Int. Cl.² ......................................... B29F 1/00
[58] Field of Search ........... 425/242, 246, 247, 190, 425/183, 185

[56] References Cited
UNITED STATES PATENTS
3,516,118   6/1970   Gallay.............................. 425/246 X
3,671,162   6/1972   Lohmann........................ 425/817 X FOREIGN PATENTS OR APPLICATIONS
1,124,235   2/1962   Germany ........................... 425/246

Primary Examiner—Francis S. Husar
Assistant Examiner—David S. Safran
Attorney, Agent, or Firm—Norman S. Blodgett; Gerry A. Blodgett

[57] ABSTRACT

Injection molding apparatus for the fabrication of molded parts made preferably out of thermoplastic materials, consisting of an injection unit arranged between two injection molds which unit is equipped with a transportable injection distributor part with two controllable closure jets and, during the injection operation, the distributor part is stationary for filling the injection mold.

1 Claim, 1 Drawing Figure

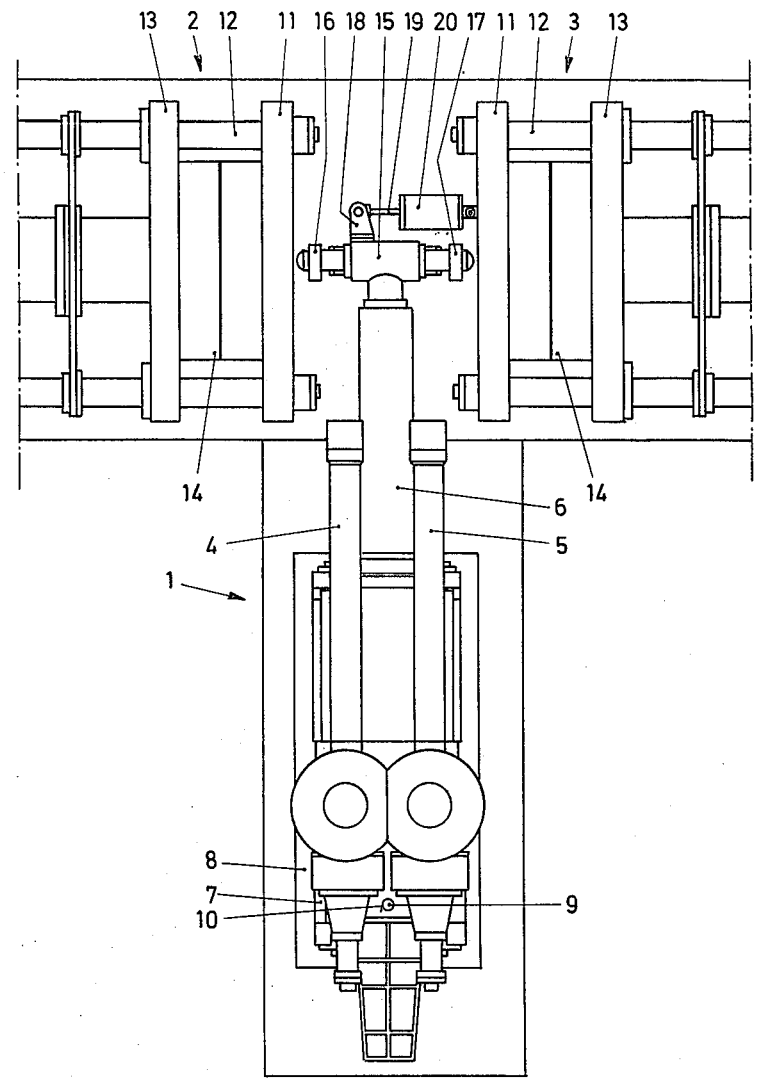

INJECTION MOLDING APPARATUS

BACKGROUND OF THE INVENTION

German patent DT-AS 2,019,133 describes an injection device for tandem injection molding machines for plastic material, preferably for processing foamed thermoplastic masses to form parts having thick walls. The device is located between two injection molds and is equipped with a transportable injection molding distributor part, equipped with two controllable closure jets. During the injection operation, the part is stationary and continuously fills the injection mold. To the two injection molds is always arranged a cylindrical jet torpedo with a longitudinal canal, which on the one hand is connected through a connecting canal with the mold hollow space and on the other hand through radial bores with the outer portion of the jet torpedos. Both jet torpedos are in separate longitudinal bores, which expand toward the injection distributor part, are displaceable, and are always sealed on the injection distributor part on the head piece which is fastened on the head side, whereby the radial bores are sealed closed through the longitudinal bores. Furthermore, every one of the two longitudinal canals on the end facing the injection distributor part is closed by a closure element in which is guided a spring-loaded closure needle. Its tip is sealably positioned against the outlet opening of the connecting canal into the longitudinal canal.

On this known device, the injection distributor can be axially displaced into three different positions. In the center position both closure jets are closed. In both end positions one of the closure jets is opened and the other is closed. Consequently, when the injection distributor part of the injection unit is carried by the injection molding machine during a displacement of the injection distributor part for interchangeable operation of the two injection moldings, the whole injection unit must be displaced in a parallel manner. This design requires expensive guides for the injection unit. Furthermore, on these devices, it is disadvantageous that the two jet torpedos constantly press against the mold. As a consequence, heat transfer always occurs away from the injection unit to the injection moldings, which unfavorably influences the cooling of the injection moldings. In addition, on this known device, the exchange of a defective closure jet is time consuming because of the stationary connection between the jet torpedos and the injection molding. Independently of this, the closure jets are correspondingly expensive without a guarantee that no leakage occurs. These and other difficulties experienced with the prior art devices have been obviated in a novel manner by the present invention.

It is, therefore, an outstanding object of the invention to provide injection molding apparatus device for fabricating molded parts from foamed thermoplastic materials in which relatively simple, leakage free closure jets are used and in which the closure jets, after the injection process, are separated from the injection molding, so that flow of heat from the injection unit to the injection molds is prevented. At the same time, expensive guides for the injection unit may be omitted and changing closure jets is easier.

With these and other objects in view, as will be apparent to those skilled in the art, the invention resides in the combination of parts set forth in the specification and covered by the claims appended hereto.

SUMMARY OF THE INVENTION

In general, the invention consists of an injection molding apparatus in which the injection unit is supported for swinging movement about a vertical pin. The injection distributor part may be brought with a closure jet to press against one of the injection moldings. By the use of the swingable arrangement of the injection unit, expensive guides are eliminated. During the dispensing of the amount of plastic to be injected, both closure jets are separated from their corresponding injection molds, so that no heat transfer occurs. In this position of the injection unit, the closure jets may be changed without difficulty. Also, the injection unit is equipped with a swingable drive. More specifically, the pin is arranged on a displaceable carriage located between the injection molds. This arrangement makes it possible, for example, to fill four injection molds one after the other with a single injection unit.

BRIEF DESCRIPTION OF THE DRAWING

The character of the invention, however, may be best understood by reference to one of its structural forms, as illustrated by the accompanying drawing, in which:

The single FIGURE of drawing is a plan view of an injection molding apparatus for fabricating mold parts from foamed thermoplastic material.

DESCRIPTION OF THE PREFERRED EMBODIMENT

Referring to the drawing, it can be seen that the apparatus consists of an injection unit 1 and injection molds 2, 3. The injection unit 1 in this form of the invention consists of two conventional conveyor extruders 4, 5 arranged in parallel with one another to which is connected a common piston reservoir 6 serving to meter the plastic masses to be injected.

The two conveyor extruders 4, 5, as well as the piston reservoir 6, are supported on a carrier plate 7 which itself is supported on a base 8. On the base 8 is vertically mounted a pin 9 which extends through a bore 10 in the carrier plate 7. A swinging movement of the carrier plate 7 is made possible by this pin.

Each injection mold 2, 3 consists in a well-known manner of a stationary closure plate 11 and a closure plate 13 which is displaceable on guide rods 12. The closure 13 may be moved back against the closure plate 11 by the known drive means. The closure plates 11, 13 of the injection molds 2, 3 serve to support the molds 14.

Between the two stationary closure plates 11 of the injection molds 2, 3, which are lined up in spaced relationship to each other, extends the free end of the piston reservoir 6 which is equipped with an injection distributor part 15. The injection distributor part 15 carries two well-known closure jets 16, 17, which are displaced from each other by 180° and which can be opened and closed independently of each other by conventional drives, not shown. The closure jet 16 is located adjacent the injection mold 2 and the closure jet 17 is located adjacent the injection mold 3. The closure jets 16, 17 are positioned adjacent the base of the injection unit 1, as shown in the drawing, and are arranged some distance from the closure plate 11.

To the injection distributor piece 15 is fastened a forked piece 18 to which is connected the piston rod 19 of a cylinder 20, which is, for example, hydraulically operated. The cylinder 20 is linked in this embodiment to the stationary closure plate 11 of the injection mold 3. By applying pressure fluid to this cylinder 20, the carrier plate 7 with the entire injection unit 1 can now swing, so that the closure jet 16 may rest against the injection mold 2 or the closure jet 17 against the injection mold 3. At that time, the corresponding closure jet 16 or 17 can be opened by the corresponding drive connected to the particular unit. As shown in the FIGURE the pivot axis of the injection unit is several times farther away from the mold sprues than the molds sprues themselves are separated. As a result of this arrangement, the path of motion of the injection jets is a straight line for all practical purposes, and small divergences from linearity can be compensated for by well-known techniques of sprue design.

An alternative form of the invention makes it possible to design the plate 8 in such a way that it is used as a carriage which is displaceable in the direction of the injection mold 2, 3. This design makes it possible to fill two more injection molds by a corresponding displacement of the injection unit 1. However, the drive for swinging the injection unit 1 must be mounted on the carriage.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Injection molding apparatus for the fabrication of molded parts, consisting of:
   a. a base,
   b. a first mold and a second mold mounted on the base, each having a sprue, the sprue of the first and second molds facing one another, and being separated by a first distance,
   c. an injection unit having an injection distributing part located between the sprues of the molds and having at least two oppositely facing controllable jets adapted to alternately engage the sprues of the molds, the injection unit being mounted on the base for pivotal movement about an axis which is a second distance from the sprues,
   d. a swing device between the injection unit and the base, the swing drive being adapted to cause pivotal movement of the injection unit to cause engagement of a jet with a sprue, the second distance being several times larger than the first distance, so that the path of the jets as the injection unit is moved by the swing unit approximates a straight line.

* * * * *